Figure 1:
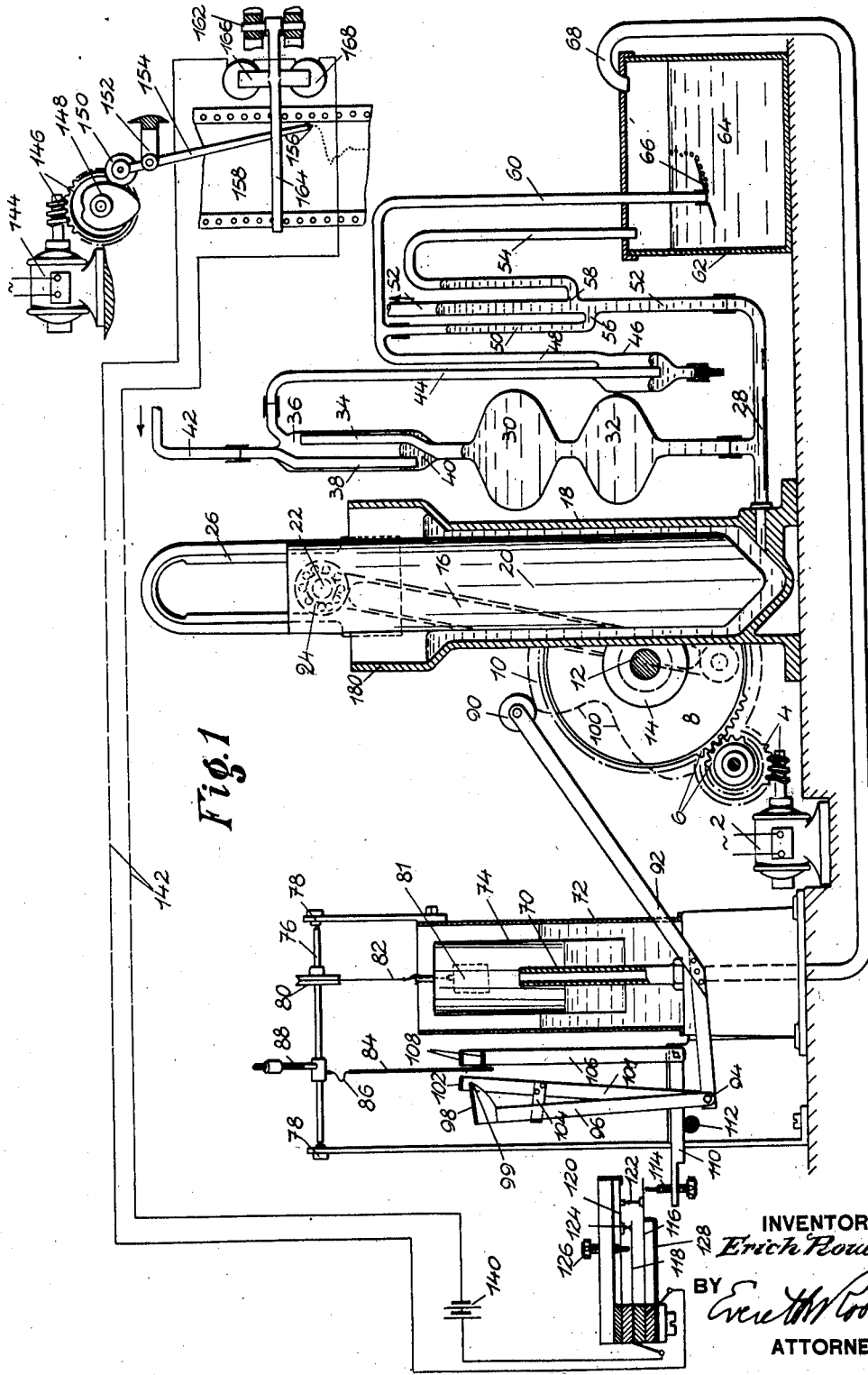

Aug. 9, 1927.

E. ROUČKA

MEASURING SYSTEM

Filed Aug. 9, 1923

1,638,104

2 Sheets-Sheet 2

INVENTOR
Erich Roučka
BY
ATTORNEYS.

Patented Aug. 9, 1927.

1,638,104

UNITED STATES PATENT OFFICE.

ERICH ROUČKA, OF BLANSKO, CZECHOSLOVAKIA.

MEASURING SYSTEM.

Application filed August 9, 1923, Serial No. 656,512, and in Czechoslovakia August 14, 1922.

This invention relates in general to a system similar to those described in my copending applications Patent No. 1,476,183 of December 4, 1923, and Serial No. 610,388, filed January 2, 1923, for transmitting or measuring variations in a value, such as a quantity or quality for measuring said quantity or quality, or for controlling or other desirable purposes, the variations in the value being transmitted at regular intervals by means of an auxiliary power impulses or changes of which are controlled by the variations in the value so that the relation of said impulses or changes in the auxiliary energy to the said interval is a function of the value and a measure therefor. The impulses of auxiliary energy affect a measuring, controlling or other suitable device.

More particularly the invention relates to a system of the character described for measuring or transmitting the extent or magnitude of movement of a movable member which is influenced by variations in a value to be measured or transmitted.

A principal object of the invention is to provide a system of this character adapted for use with measuring systems wherein the value being measured constantly varies, and providing means for holding a member movable in accordance with said variations in its indicating position for an interval of time, during which interval the said member cooperates with means actuated by auxiliary power to produce changes or impulses of an auxiliary energy.

Another object is to provide a system of this character adapted for use with measuring systems wherein the value being measured constantly varies during a certain period of time and the extent of the variation at the end of said interval is desired to be ascertained. One type of such measuring system is a gas analyzing apparatus in which percentage of a certain gas in a gaseous mixture is ascertained by an absorption of all gases except that being measured by pumping the gaseous mixture into a closed vessel for a certain period of time, the non-absorbed gas influencing a floating bell movement of which by the gas is influenced by the pump in varying the gas space in the system.

Another object is to provide in such a system a common motor for actuating the apparatus which influences or causes the movements of said member movable in accordance with variations in the value and for actuating the impulse producing means.

Other objects are to provide novel and improved means for temporarily maintaining the said movable member in its indicating position during the interval when the impulse is produced to ensure accurate transmission of said position; and to utilize for this purpose in a gas analyzing apparatus a pump of novel construction.

Further objects are to provide a system embodying a novel construction and arrangement of apparatus, and to obtain other results and advantages as may be brought out by the following description.

Figure 2:
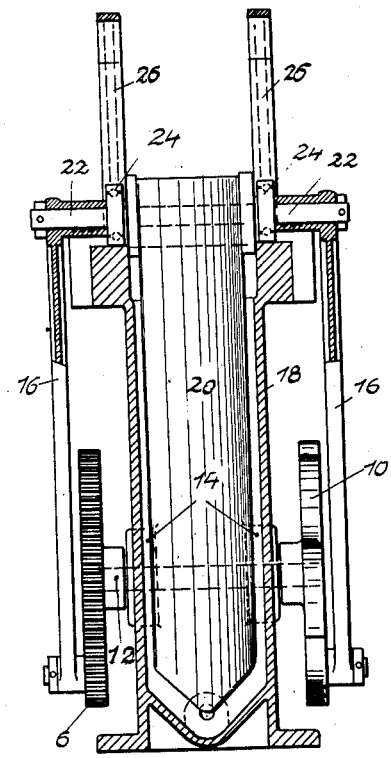
Figure 3:
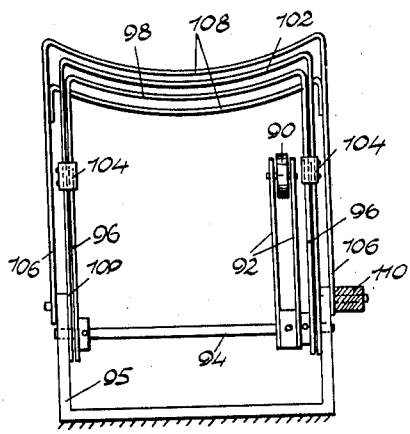

Referring to the accompanying drawings, in which the same reference characters designate corresponding and like parts, Figure 1 is a diagrammatic illustration of a system embodying my invention, showing the same used in connection with a gas analyzing apparatus;

Figure 2 is a transverse vertical sectional view through the pump of the gas analyzing apparatus, showing the cam for determining the intervals during which the transmitting impulses are produced, and Figure 3 is a side elevation of a portion of the impulse producing mechanism, portions being omitted for clearness in illustration.

For the purpose of illustrating the principles of the invention, I have shown the same used in connection with a gas analyzing apparatus substantially identical in construction and operation with that shown in my copending application Serial No. 656,515, filed August 9, 1923, said apparatus including a cylinder 18 to receive a liquid having one end thereof open and the other end in communication through a pipe 28 with a measuring gas container 30 and auxiliary gas container 32. A piston 20 is loosely reciprocable in said cylinder and is actuated through diametrically opposite trunnions 22 and connecting rods 16 and crank discs 8 and 10 by a synchronous motor 2 connected to any suitable source of alternating current and driving one of said crank discs, in the present instance the disc 8, through worm and worm wheel gearing 4 and gearing 6. The crank discs 8 and 10 are mounted on a shaft 12 journaled in bearings 14 mounted on the cylinder, and rollers 24 are journaled on the trunnions 22 and movable in vertical guideways 26, whereby rotation of the crank discs 8 and 10 by the motor 2 reciprocates the piston 20 in the cylinder 18. The upper open end of the cylinder is larger in cross-sectional area than the body of the cylinder for a purpose hereinafter described.

The measuring gas container 30 is connected through a liquid check valve 36 and pipe 42 to a source of gaseous mixture to be analyzed. The pipe 42 is connected to a tube 38 which is immersed in mercury 40 in the valve 36, and the container 30 communicates with said valve by a pipe 34. The said valve 36 is connected by a pipe 44 through a check valve 46 and pipe 48 to an automatic valve 52, 56, 58 and also through a pipe 60 to an absorption vessel 62 containing a suitable absorbing liquid 64. The automatic valve 52, 56, 58 is also connected to the gas space of said absorption vessel by a pipe 54. One end of said valve 56, 58 is connected to the pipe 28, while the other end is vented to the atmosphere by variations in the level of the liquid produced by reciprocation of the piston 20. The gas space of the absorption vessel 62 is connected by a pipe 68 to a nozzle 70 communicating with the interior of an inverted bell 74 floating in a liquid in a container 72. The said bell 74 is connected to one end of a flexible connector 82 which passes over a pulley 80 carried by a shaft 76 mounted in fixed bearings 78, the other end of said connector 82 carrying a counterweight 81.

In the operation of the gas analyzing apparatus, as the piston 20 rises the gaseous mixture to be tested is drawn through the pipe 42 and valve 36 into the measuring and auxiliary gas containers 30 and 32. As the piston next descends the liquid in the apparatus is caused to rise and force the gas from the containers 30 and 32 through the valve 36, pipe 44, check valve 46 and valve 52, 56 into the atmosphere. While the level of the liquid is below the valve 58, the gas space of the absorption vessel 62 is also vented to the atmosphere so that the bell 74 falls to its zero position. When the liquid in the apparatus passes both the valves 56 and 58, the gases are forced through the pipe 60 and nozzle 66 into the absorbing liquid 64. The non-absorbed gas is conducted by the pipe 68 into the bell 74 which is caused to rise as the volume of the gas increases and permit rotation of the shaft 76 by the counterweight 81. As the piston approaches its lowermost position and the level of the pumping liquid approaches its highest point, the liquid enters the enlarged end 180 of the piston so as to prevent further rise of the level of the pumping liquid and hold said level in the valve 52, 56 and 58 for an interval of time until the piston 20 is well started on its next upward stroke. In this manner the bell 74 is temporarily held in the position assumed by it at the end of the pumping stroke.

A shaft 76 carries through a flexible connection 86 an arm 84 counterbalanced by a counterweight 88, said arm 84 being oscillated by rotation of the shaft 76 and its position being a function of the variation in the volume of gas influencing the bell 74.

It is the position of this arm 84 which is to be transmitted, since its position is a measure of the value being measured. The transmitting mechanism includes the crank disk 10 the periphery of which is in the form of a cam, the major portion of which is concentric with the shaft 12 while the other portion is in the form of a cam notch 100 the length of which corresponds to the interval during which the bell 74 is held stationary. A lever 92 is carried by a shaft 94 journaled in a frame 95 (see Figure 3), one end of said lever carrying a roller 90 which follows the periphery of the cam 10. The shaft 94 also has fixed thereon a substantially U-shaped member 96 the base 98 of which is arcuate and concentric with the axis of the shaft 76 and arranged at one side of the arm 84. Said base portion 98 is formed with an inclined edge 99 for a purpose hereinafter described. A second U-shaped member 106 has the ends of its arms connected to levers 110 fulcrumed on a bar 112. The base portion of said member 106 is in the form of two spaced parallel arcuate sections 108 which are arranged at the side of the arm 84 opposite the member 96 and disposed at opposite sides of the base portion 98 of said member 96. A third U-shaped member 101 is pivotally mounted on the shaft 94 and includes a base portion 102 arranged at the side of the arm 84 corresponding to the member 96, said member 101 being loosely connected to the member 96 by clips 104 whereby said member 101 may move independently of the member 96 in both directions and with the member 96 in the direction away from the arm 84.

With this construction it will be obvious that when the roller 90 follows the cam notch 100, the lever 92 will be oscillated whereby the portion 98 thereof will be forced into engagement with the arm 84 which in turn will be forced against the portion 108 of the member 106. The member 102 lightly presses the arm 84 against the portion 108 before the member 96 engages said arm to hold said arm against movement in either direction as it is engaged by the inclined edge 99 of said member 96, the pressure of the member 102 being insufficient to move the member 106. The inclined edge 99 engages the arm 84 with considerable pressure so that the arm 84 might be displaced along said inclined edge out of its true indicating position unless some means such as the member 102 is provided to hold the arm against such displacement. The member 108 is thus moved with the member 96 whereby the levers 110 are oscillated about the fulcrum 112. The cam notch 100 determines the interval during which the impulses will be produced, and the time position of the impulse in or the relation thereof to said interval is determined by the inclined edge 99 of the base portion 98 of the member 96 and the position of the arm 84. For instance, if the arm 84 is adjacent the wide end of the portion 98 of the member 96 the impulse will take place at an earlier time in the interval than if the arm 84 is nearer the narrow end of said portion 98. This operation is identical with that shown in my copending application Serial No. 610,388. It will be noted that the roller 90 will fall into the cam notch 100 before the piston 20 reaches the end of its downward stroke and while the bell 74 is temporarily held in the position assumed at the end of said piston stroke.

For the purpose of transmitting the impulses, they may be transformed into electrical impulses by means of a switch mechanism actuated by one of the arms 110. Thus, one of said arms may be formed with an adjustable screw 114 adapted to engage a spring contact strip 116 having a contact 122 adapted to engage a second spring contact strip 120 whereby movement of the lever 110 under influence of the lever 92 and member 98 will produce contact between the strips 116 and 120. The strip 116 is connected through a plate 128 to one terminal of a source 140 of electricity, and a spring strip 118 is connected to the other side of said source through a receiving device. Contact between the strip 124 and the strip 118 is produced by contact points 124. Upon the initial movement of the lever 110, the contact 122, 120 is produced which closes the circuit through the source 140. Further movement of the lever forces the strip 120 away from the strip 118 to break the contact 124, whereupon the said circuit is opened. When the circuit is closed an impulse of electricity is produced, and the duration of said impulse is obviously determined by the time between the making of the contact 122, 120 and the breaking of the contact 124. A set screw 126 is utilized to adjust the contact 124.

The receiving means for said impulses may be placed at a position remote from the mechanism hereinbefore described by means of wires 142. Said receiving mechanism may be of known construction, and is shown as comprising a synchronous electric motor 144 which may be connected to the same source of alternating current as the motor 2, said motor 144 rotating a cam 148 through worm and worm wheel gearing 146. The rotation of the cam 148 is synchronous with that of the cam 10, and the cam 148 is followed by a roller 150 connected at one end of a lever 154 pivoted intermediate its ends to a fixed support at 152. The other end of said lever 154 is adapted to swing over a movable record strip 158 in normally spaced relation thereto and may carry a recording pen 156. Electromagnets 168 are connected in series with the source of electricity 140, and cooperate with an armature lever 164 pivotally connected at one end to a fixed support as at 168 with its other end overlying the lever 154.

With this construction it will be observed that the lever 154 may be constantly oscillated over the record strip in accordance with the oscillation of the lever 92. Each time an impulse of electricity is produced by the switch mechanism 120, 122, 124 by oscillation of the lever 92 in the cam notch 100, the magnets 168 are energized and attract the armature 164 which forces the pen 156 into engagement with the record strip thereby producing a record consisting of a plurality of spaced dots each of which is a function of the corresponding volume of the gas influencing the bell 74 and a measure therefor. Each oscillation of the lever 154 corresponds to the time interval, and the position of the record dots on the record sheet indicates the time position or relation of the impulses in said time interval. In other words, the dots correspond to the position of the arm 84 which in turn corresponds to the position of the bell 74 at the end of the measuring interval.

It will be understood that where the invention is used in connection with a gas analyzing apparatus, as in the present instance, the position of the arm 84 is in accordance with the composition of the gaseous mixture being analyzed. It will further be observed that the one motor 2 serves to operate both the mechanism which causes the movement of the arm 84 and the mechanism which produces the measuring impulses.

It should be noted that the present invention resides particularly in the transmitting apparatus, that is, means for transmitting impulses of auxiliary energy at time positions in regular intervals of time corresponding to and as functions of the positions of the movable member 84. The general combination of transmitting apparatus of this type and receiving apparatus to cooperate therewith is described and claimed in my copending application Serial No. 625,153, filed March 14, 1923.

While I shown and described a system embodying certain constructions and arrangement of apparatus and in connection with a gas analyzing apparatus, it will be understood that this is only for the purpose of illustrating the principles of the invention and that many modifications and changes can be made in the details of construction and arrangement and that the invention is susceptible of use with other types of measuring systems without departing from the spirit or scope of the invention. Therefore, I do not wish to be understood as limiting myself except as required by the following claims when construed in the light of the prior art.

Having thus described the invention, what I claim is:

1. A transmitting system of the character described comprising a member variably movable between two extremes in accordance with the variations of the magnitude of a condition to be transmitted in cycles of regular intervals of time, means for temporarily holding said movable member in the position assumed at the end of each cycle, means actuated by auxiliary power in cycles of regular intervals of time, a source of auxiliary energy, and means to cooperate with the last-mentioned means and said movable member while the latter is in the position assumed at the end of the cycle to produce an impulse of said auxiliary energy so that the time positions of said impulses in the intervals of time of the corresponding cycles are dependent upon and functions of the positions of said movable member.

2. In a system for transmitting indications of the composition of a gaseous mixture, the combination of a member movable in accordance with variations in the composition of a gaseous mixture between two extremes in cycles of regular intervals of time, means for temporarily maintaining said member in the positions assumed at the end of each cycle, means movable by auxiliary power in cycles synchronously with said intervals, and a source of auxiliary energy, means for causing cooperation of said member and said movable means at points in said cycles dependent upon the then position of said member to produce impulses of auxiliary energy so that the time positions of said impulses in the corresponding intervals are functions of the composition of said gaseous mixture.

3. In a system for transmitting variations in composition of a gaseous mixture, the combination of a gas analyzing apparatus including an absorption vessel, a member movable in accordance with variations in the amount of non-absorbed gas, a pump for drawing gaseous mixture from a source and forcing it into said absorption vessel, said pump being constructed to control the non-absorbed gas to maintain said member in its indicating position at the end of each measuring operation for an interval of time, means movable by auxiliary power in regular cycles during said intervals of time, a source of auxiliary energy, and means to cooperate with said member and the last-mentioned means at points in said cycles dependent upon the then positions of said movable member to produce impulses of said auxiliary energy so that said impulses have time positions in said intervals which are functions of the variations of the amount of said non-absorbed gas.

4. In a system for transmitting variations in composition of a gaseous mixture, the combination of a gas analyzing apparatus including an absorption vessel, a member movable in accordance with variations in the amount of non-absorbed gas, a pump for drawing gaseous mixture from a source and forcing it into said absorption vessel, said pump being constructed to control said non-absorbed gas to maintain said member in its indicating position at the end of each measuring operation for an interval of time, means movable by auxiliary power in regular cycles during said intervals of time arranged at one side of said member, a source of auxiliary energy, other movable means arranged at the opposite side of said member, one of said last two named means being inclined toward the other and to the plane of movement of said movable member, both said means being adapted to cooperate with said member to produce impulses of said auxiliary energy at points in said cycles dependent upon the relative positions of said member and said inclined means so that the time positions of said impulses in corresponding intervals are functions of the variations in the amount of said non-absorbed gases.

5. In a system for transmitting variations in composition of a gaseous mixture, the combination of a gas analyzing apparatus including an absorption vessel, a member movable in accordance with variations in the amount of non-absorbed gas, a pump for drawing gaseous mixture from a source and forcing it into said absorption vessel, said pump being constructed to control the non-absorbed gas to maintain said member in its indicating positions at the end of each measuring operation for an interval of time, a source of auxiliary energy, means movable by the pump actuating mechanism in regular cycles during said intervals of time to cooperate with said member to produce an impulse of auxiliary energy at points in said cycles dependent upon the then positions of said member so that said impulses have time positions in said intervals as functions of the variations of the amount of said non-absorbent gas.

6. In a system for transmitting variations in composition of a gaseous mixture, the combination of a gas analyzing apparatus including an absorption vessel, a member movable in accordance with variations in the amount of nonabsorbed gas, a pump for drawing gaseous mixture from a source and forcing it into said absorption vessel, said pump being constructed to control the non-absorbed gas to maintain said member in its indicating position at the end of each measuring operation for an interval of time, means movable by the pump actuating mechanism in regular cycles during said intervals of time arranged at one side of said member, a source of auxiliary energy, other movable means arranged at the opposite side of said member, one of said last two named means being inclined toward the other and to the plane of said movable member, both said means being adapted to cooperate with said member to produce impulses of auxiliary energy at points in said cycles dependent upon the relative positions of said member and said inclined means so that the time positions of said impulses in corresponding intervals are functions of the variations in the amount of said nonabsorbed gases.

7. In a system for transmitting variations in the composition of a gaseous mixture, the combination of a gas analyzing apparatus including an absorption vessel, a float container having an inverted bell therein adapted to be influenced by non-absorbed gas from said absorption vessel, a member movable in accordance with said float, a pump including a cylinder and a reciprocable piston for drawing gaseous mixture from a source and forcing it into said absorption vessel, said pump being constructed to control the nonabsorbed gas to maintain said float and said movable member in their indicating positions for intervals of time, means for driving said pump, means movable with said pump in regular cycles during said intervals, a source of auxiliary energy, means cooperating with said movable member and said movable means during said intervals at points in said cycles dependent upon the relative positions of said movable member and said last two mentioned means to produce impulses of auxiliary energy so that the time positions of said impulses in said intervals are functions of the amount of non-absorbed gas influencing the float.

8. In a system for transmitting variations in the composition of a gaseous mixture, the combination of a gas analyzing apparatus including an absorption vessel, a float container having an inverted bell therein adapted to be influenced by non-absorbed gas from said absorption vessel, a member movable in accordance with said float, a pump including a cylinder and a reciprocable piston for drawing gaseous mixture from a source and forcing it into said absorption vessel, said pump being constructed to control said non-absorbed gas to maintain said float and said movable member in their indicating positions for intervals of time, drive means for reciprocating said piston including a rotating shaft, means movable by said shaft in regular cycles during said intervals of time, a source of auxiliary energy, means cooperating with said movable member and said movable means during said intervals at points in said cycles depending on the relative positions of said movable member and said last two mentioned means to produce impulses of auxiliary energy so that the time positions of said impulses in said intervals are functions of the amount of non-absorbed gas influencing the float.

9. In a system for transmitting variations in the composition of a gaseous mixture, the combination of a gas analyzing apparatus including an absorption vessel, a float container having an inverted bell therein adapted to be influenced by non-absorbed gas from said absorption vessel, a member movable in accordance with said float, a pump including a cylinder and a reciprocable piston for drawing gaseous mixture from a source and forcing it into said absorption vessel, said pump being constructed to control the non-absorbed gas to maintain said float and said movable member in their indicating positions for intervals of time, drive means for reciprocating said piston including a rotating shaft, a cam rotatable with said shaft, a source of auxiliary energy, means movable by said cam in regular cycles during said intervals of time, and means cooperating with said movable member and said movable means during said intervals at points in said cycles depending on the relative positions of said movable member and said last two mentioned means to produce impulses of auxiliary energy so that the time positions of said impulses in said intervals are functions of the amount of non-absorbed gas influencing the float.

10. In a system for transmitting variations in the composition of a gaseous mixture, the combination of a gas analyzing apparatus including an absorption vessel, a float container having an inverted bell therein adapted to be influenced by non-absorbed gas from said absorption vessel, a member movable in accordance with said float, a pump including a cylinder and a reciprocable piston for drawing gaseous mixture from a source and forcing it into said absorption vessel, said pump being constructed to control said non-absorbed gas to maintain said float and said movable member in their indicating positions for intervals of time, drive means for reciprocating said piston including a rotating shaft, a cam rotatable with said shaft and having a cam surface the length of which corresponds to said intervals of time, means movable by said cam surface in regular cycles, a source of auxiliary energy, means cooperating with said movable member and said movable means during said intervals at points in said cycles depending on the relative positions of said movable member and said last two mentioned means to produce impulses of auxiliary energy so that the time positions of said impulses in said intervals are functions of the amount of non-absorbed gas influencing the float.

11. In a system for transmitting variations in composition of a gaseous mixture, the combination of a gas analyzing apparatus including an absorption vessel, a member movable in accordance with variations in the amount of non-absorbed gas, a pump for drawing gaseous mixture from a source and forcing it into said absorption vessel, said pump being constructed to control the non-absorbed gas to maintain said member in its indicating position at the end of each measuring operation for an interval of time, a motor for actuating said pump, means movable by said motor in regular cycles during said intervals of time, a source of auxiliary energy, and means actuated by cooperation of said movable member and said movable means during said intervals at points in said cycles depending on the relative positions of said movable member and said last two mentioned means to produce impulses of auxiliary energy so that the time positions of said impulses in said intervals are functions of the variation in the amount of said non-absorbed gas.

ERICH ROUČKA.